United States Patent [19]
DiStasio

[11] Patent Number: 5,951,224
[45] Date of Patent: *Sep. 14, 1999

[54] LOCKING NUT AND BOLT SYSTEM

[75] Inventor: Robert J. DiStasio, Valhalla, N.Y.

[73] Assignee: Permanent Technologies, Inc., Massapequa, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/747,323

[22] Filed: Nov. 12, 1996

Related U.S. Application Data

[60] Provisional application No. 60/015,980, Apr. 15, 1996, and provisional application No. 60/015,230, Apr. 10, 1996.

[51] Int. Cl.$^6$ .................................................. F16B 39/02
[52] U.S. Cl. ........................ 411/329; 411/299; 411/303; 411/115
[58] Field of Search ................................ 411/299, 329, 411/327, 322, 321, 7, 114, 115, 302, 303

[56] References Cited

U.S. PATENT DOCUMENTS

| | | | |
|---|---|---|---|
| 307,722 | 11/1884 | Klemroth et al. | |
| 589,599 | 9/1897 | Hardy | 411/299 |
| 591,062 | 10/1897 | Smith | |
| 827,289 | 7/1906 | Bowers | 411/329 |
| 1,088,892 | 3/1914 | Foreman | |
| 1,089,159 | 3/1914 | Santarcangelo | |
| 1,136,310 | 4/1915 | Burnett | |
| 1,208,210 | 12/1916 | Purcell | 411/329 |
| 1,221,194 | 4/1917 | Lang | |
| 1,226,143 | 5/1917 | Stubblefield et al. | |
| 1,245,362 | 11/1917 | Lynch | |
| 1,278,028 | 9/1918 | Savory et al. | 411/329 |
| 1,352,103 | 9/1920 | Thibert | 411/299 |
| 1,465,148 | 8/1923 | Rosenberg | |
| 1,703,947 | 3/1929 | Nation | 35/47 |
| 2,232,336 | 2/1941 | Meersteiner | 411/329 |
| 2,301,181 | 11/1942 | Ilsemann | 151/22 |
| 2,484,645 | 10/1949 | Baumle | 85/1 |
| 2,521,257 | 9/1950 | Sample | 411/329 |
| 2,834,390 | 5/1958 | Stevens | 151/11 |
| 3,176,746 | 4/1965 | Walton | 151/22 |
| 3,517,717 | 6/1970 | Orlomoski | 151/22 |
| 3,729,757 | 5/1973 | Wright | 10/86 A |
| 3,982,575 | 9/1976 | Ollis et al. | 151/22 |
| 4,024,899 | 5/1977 | Stewart | 151/14 R |
| 4,168,731 | 9/1979 | Taber | 151/11 |
| 4,790,703 | 12/1988 | Wing | 411/260 |
| 4,900,208 | 2/1990 | Kaiser et al. | 411/387 |
| 5,238,342 | 8/1993 | Stencel | 411/43 |
| 5,460,468 | 10/1995 | DiStacio | 411/329 |
| 5,538,378 | 7/1996 | Van Der Drift | 411/329 |

FOREIGN PATENT DOCUMENTS

| | | | |
|---|---|---|---|
| 142748 | 5/1920 | United Kingdom | 411/299 |
| 662298 | 12/1951 | United Kingdom | 411/302 |

Primary Examiner—Flemming Saether
Attorney, Agent, or Firm—Robert C. Kain, Jr.

[57] ABSTRACT

The bolt, in the one-way nut and bolt combination, includes a head, a stem, and bolt threads on said stem. A longitudinal channel is defined on the bolt stem by a plurality of notches extending through the crests of the threads. In one embodiment, each notch is defined by a radially aligned surface and an angularly displaced surface. The nut, in one embodiment, has a threaded bore that is complimentary to the bolt thread and includes at least one longitudinal cut-out. The nut further includes a compressible tine extending into the cut-out. The compressible tine has a body portion and a substantially radially aligned distal end portion. The distal end portion of the tine and the cut-out defines a narrow mouth leading to a wider throat deeper in the cut-out. The nut thread and the bolt thread cooperatively permit a user to translate the nut along the bolt threads by means of one-way rotation. The tine is alternately flexed inboard into the cut-out, by the bolt threads, and then released when the tine is disposed in the longitudinal channel. The longitudinal channel and respective notches forming the channel prevent counter-rotational movement of the nut on the bolt when the distal end of the tines abuts the radially aligned surface of the notches. In another embodiment, the tine is located on an insert. The insert is mounted in the nut. In another embodiment, the tine is formed at one terminal end of a U-shaped or a J-shaped clip. The clip is slipped over a sheet panel to thereby form a locking nut bore.

14 Claims, 6 Drawing Sheets

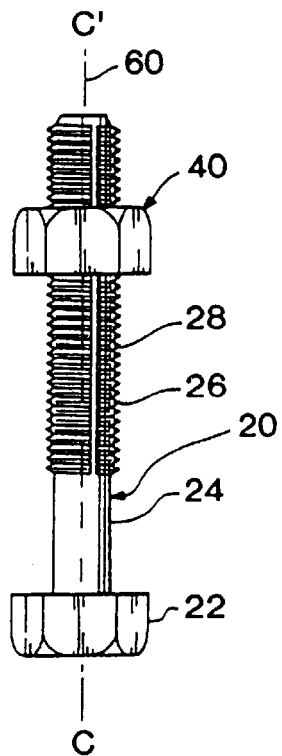
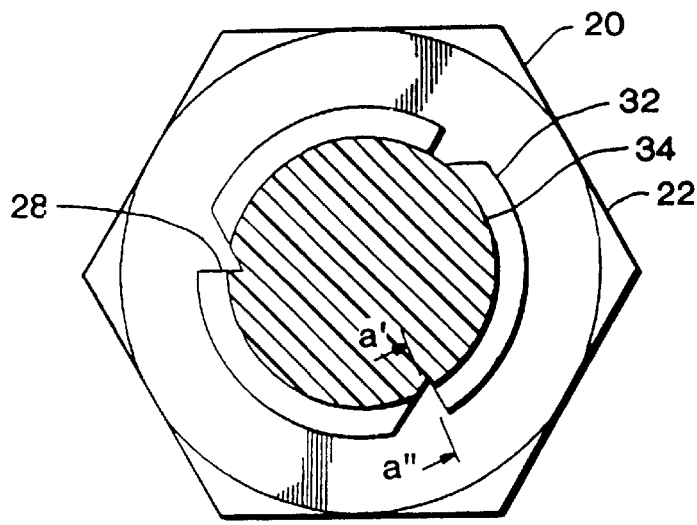
FIG. 1
FIG. 2
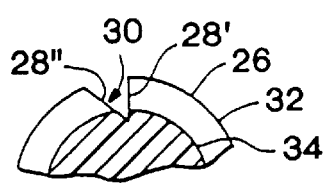
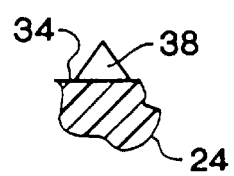
FIG. 3
FIG. 4

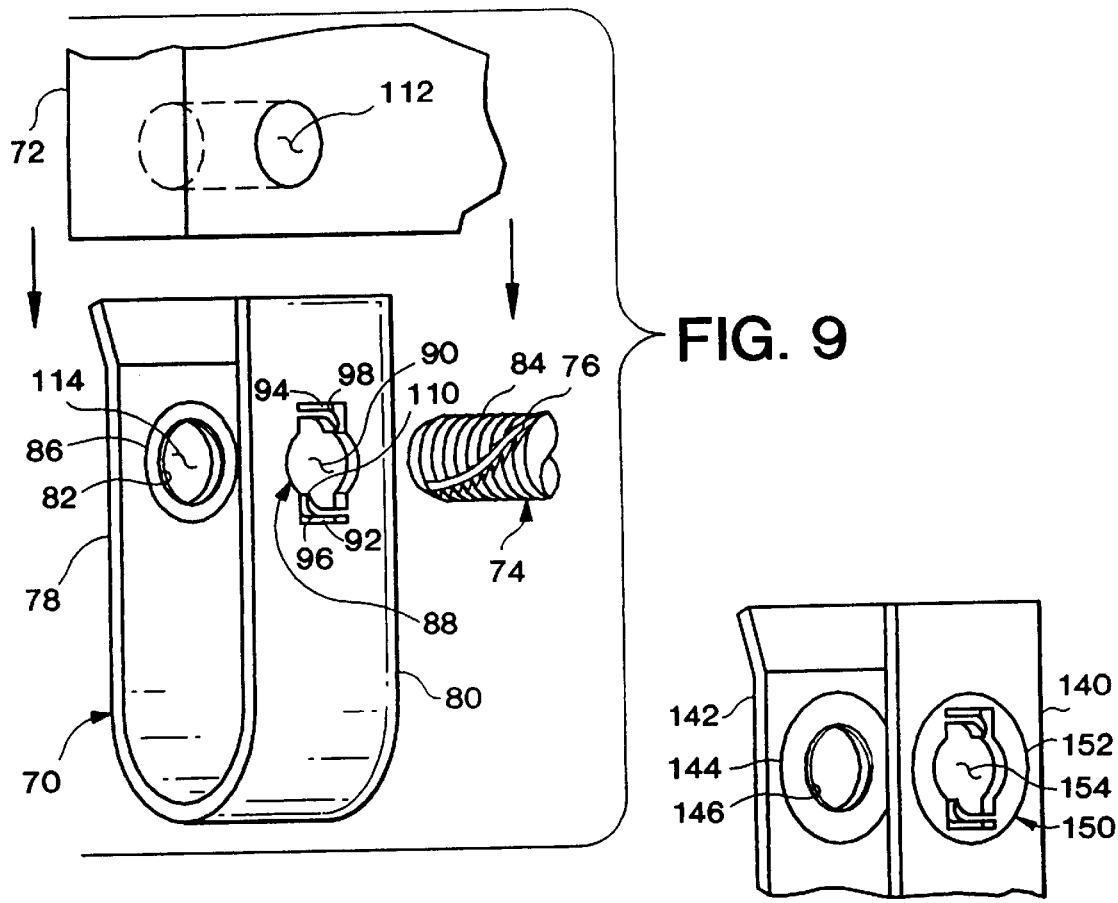
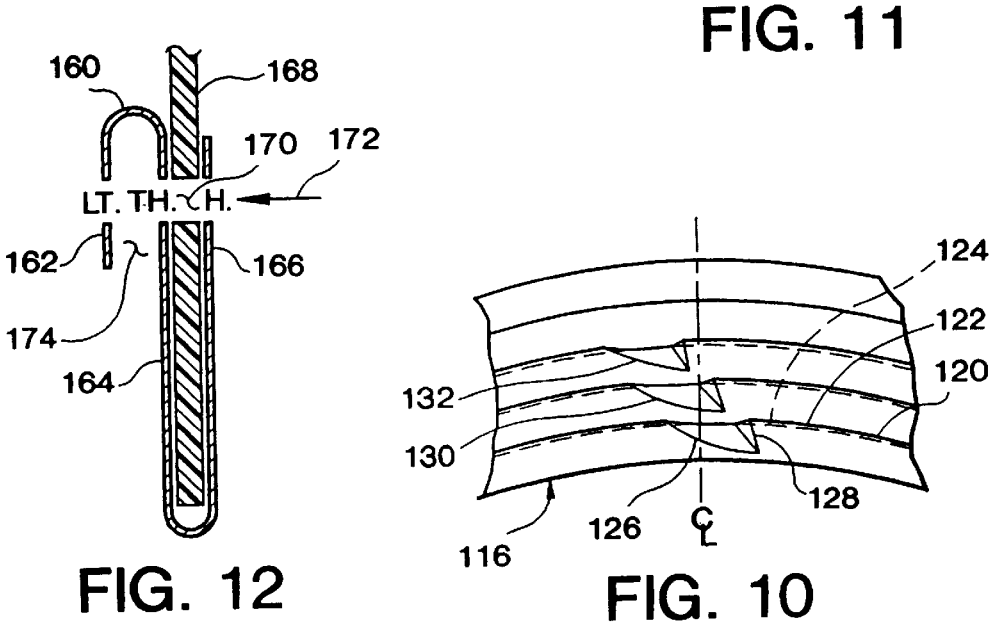

LOCKING NUT AND BOLT SYSTEM

The present patent application is based upon provisional patent application Ser. No. 60/015,980 filed Apr. 15, 1996, now pending, and provisional patent application Ser. No. 60/015,230 filed Apr. 10, 1996, now pending.

BACKGROUND OF THE INVENTION

U.S. Pat. No. 307,722 to Klemroth discloses a bolt A with longitudinal channel D running through the crest of the threads. The nut has a tine extending above a flat end surface of the nut. The tine pops into and out of channel D. U.S. Pat. No. 591,062 to Smith discloses a bolt with a longitudinal channel which enables a chisel to be placed in a slot in a nut block and further to stop rotation of the bolt with respect to the block. U.S. Pat. No. 1,088,892 to Foreman discloses a screw with a longitudinal channel extending through the threads of the bolt. The tine is located outside of the nut threads.

U.S. Pat. No. 1,136,310 to Burnett discloses small notches cut in the top of the crest of the bolt threads. The notches define radially aligned surfaces. A flexible tine in the interior of the nut moves in and out of the small notches. U.S. Pat. No. 1,211,194 to Lang discloses what appears to be a bolt with longitudinal channels on its threads. A sheet steel spring is wrapped around the nut and a portion of the spring is inserted through the nut to lock into the bolt channels. U.S. Pat. No. 1,226,143 to Stubblefield et al. discloses a bolt with longitudinal channels having a somewhat radial surface and an angularly disposed surface. The nut has an annular groove on one face thereof. A semi-circular member fits within the groove. One end of the semi-circular member defines a tine that pops into and out of the bolt channels.

U.S. Pat. No. 1,245,362 to Lynch discloses a bolt with a single, offset bolt thread crest which catches on a cut-out in the nut. U.S. Pat. No. 1,278,028 to Savory et al. discloses a bolt with a longitudinal channel and tines in a nut which are mounted in an internally located groove. The internal groove has a single radial dimension. U.S. Pat. No. 1,465,148 to Rosenbert discloses a bolt with a longitudinal channel through the thread crest. No nut is shown. U.S. Pat. No. 1,703,947 to Nation discloses a bolt with several longitudinal channels. A single tine is located at an interior position in the nut. The tine in the nut has a terminal end that is radially moved inward based upon the position of a locking cam. The locking cam extends radially through the nut. U.S. Pat. No. 2,232,336 to Meersteiner discloses a bolt with a longitudinal channel. No nut is shown.

U.S. Pat. No. 2,301,181 to Ilsemann discloses non-load bearing or carrying faces of most of the bolt threads which are deformed and which carry locking projections. Locking projections on a plurality of bolt threads are adapted to engage nut threads and compensate for the clearances in the assembly to align and frictionally lock the nut and bolt together. The nonload carrying faces of each bolt thread include two annular series of spaced, rounded projections. The surfaces of the projections are substantially rounded. Bolt projections force the load bearing surface of the bolt against the load bearing surfaces of the nut. U.S. Pat. No. 2,484,645 to Baummler discloses a bolt with longitudinal channels. No nut is shown. U.S. Pat. No. 2,521,257 to Sample discloses a bolt with longitudinal channels. Springy tines are mounted at one end of the nut flip in and out of channels.

U.S. Pat. No. 2,834,390 to Stevens discloses bolts which appear to have longitudinal channels through the threads. A plurality of radially inward pointed teeth on the nut provide locking for the combination. U.S. Pat. No. 3,176,746 to Walton discloses that each crest of each thread on the bolt has a gouged out portion. These portions, when aligned, are similar to a longitudinal channel. No nut is disclosed. U.S. Pat. No. 3,517,717 to Orlomoski discloses threads on a bolt which include two outwardly directed prongs. The prongs flex inward when the bolt is screwed onto a nut. The sliced away wedge or prongs do not have a narrow mouth and a deep throat. No nut is disclosed.

U.S. Pat. No. 3,792,757 to Wright discloses a nut with a bore having a triangular cross-sectional dimension. U.S. Pat. No. 3,982,575 to Ollis et al. discloses a thread on each bolt with a plurality of ridges forming wedge surfaces. U.S. Pat. No. 4,024,899 to Stewart discloses a top of each crest of the bolt thread having a slice and a prong protruding therefrom. The prong fits within a cut-out depression in the root of the nut thread. The cut-outs at the root of the threads do not appear to be radially aligned. U.S. Pat. No. 4,168,731 to Taber discloses a root of the nut with a cut-out and the bolt having a plurality of wedges which fit within the nut cut-out.

U.S. Pat. No. 4,790,703 to Wing discloses a nut with a bore with an imperfect, non-symmetrical cross-sectional aspect. U.S. Pat. No. 4,790,208 to Kaiser et al. discloses a bolt with a longitudinal channel through the threads. U.S. Pat. No. 5,238,342 to Stencel discloses a bolt with a longitudinal channel into which snaps inwardly biased wings from a nut insert. The nut insert is an elongated cylinder which fits within a cylindrical bore in the nut. The wings protrude at an angle, tangentially inward towards the bolt's axial centerline.

U.S. Pat. No. 5,460,468 to DiStacio discloses a bolt having one or more longitudinal channels through the bolt threads. The nut has one or more tines which cooperate with the channels to prevent counter-rotation of the bolt with respect to the nut. The tine or tines define a narrow mouth leading to a wider throat behind the tine such that the mouth and throat enable the tine to flex therein while the bolt threads radially move the tine back and forth during one-way rotation of the bolt with respect to the nut.

OBJECTS OF THE INVENTION

It is an object of the present invention to provide a one-way nut and bolt combination.

It is another object of the present invention to provide a one-way nut and bolt combination which locks the nut and bolt at predefined positions, thereby eliminating the possibility that vibration may loosen the nut and bolt.

It is a further object of the present invention to provide a nut that readily can be removed, by a user, from the bolt.

It is yet another object of the present invention to provide a one-way nut and bolt combination that does not require the use of any special tools to correctly install the nut on the bolt.

It is a further object of the present invention to provide a one-way nut and bolt combination which automatically locks into place upon counter-rotational movement of the nut without additional actions or mechanical adjustments to secure the lock between the nut and the bolt.

It is another object of the present invention to provide a locking nut on a U-shaped or a J-shaped clip.

It is an additional object of the present invention to provide a U-shaped or J-shaped clip that slips onto sheet panels to thereby form a locking nut bore sub-assembly.

It is another object of the present invention to provide an insert for a nut wherein the insert carries one or more locking tines.

SUMMARY OF THE INVENTION

The bolt, in the one-way nut and bolt combination, includes a head, a stem, and bolt threads on said stem. A longitudinal channel is defined on the bolt stem by a plurality of notches extending through the crests of the threads. In one embodiment, each notch is defined by a radially aligned surface and an angularly displaced surface. The nut, in one embodiment, has a threaded bore that is complimentary to the bolt thread and includes at least one longitudinal cut-out. The nut further includes a compressible tine extending into the cut-out. The compressible tine has a body portion and a substantially radially aligned distal end portion. The distal end portion of the tine and the cut-out defines a narrow mouth leading to a wider throat deeper in the cut-out. The nut thread and the bolt thread cooperatively permit a user to translate the nut along the bolt threads by means of one-way rotation. The tine is alternately flexed inboard into the cut-out, by the bolt threads, and then released when the tine is disposed in the longitudinal channel. The longitudinal channel and respective notches forming the channel prevent counter-rotational movement of the nut on the bolt when the distal end of the tines abuts the radially aligned surface of the notches. In another embodiment, the tine is located on an insert. The insert is mounted in the nut. In another embodiment, the tine is formed at one terminal end of a U-shaped or a J-shaped clip. The clip is slipped over a sheet panel to thereby form a locking nut bore.

BRIEF DESCRIPTION OF THE DRAWINGS

Further objects and advantages of the present invention can be found in the detailed description of the preferred embodiments when taken in conjunction with the accompanying drawings in which:

FIG. 1 illustrates a side view of the one-way nut and bolt;

FIG. 2 illustrates a bottom cross-sectional view of the bolt;

FIG. 3 illustrates a partial, cross-sectional view of the bolt from the opposite view of FIG. 2 showing a detail view of the bolt channel;

FIG. 4 depicts a partial, cross-sectional view of the bolt and particularly showing a notch on a bolt thread;

FIG. 9 diagrammatically illustrates a U-shaped clip with a locking nut configuration and a partial view of a with an angular locking channel;

FIG. 10 diagrammatically illustrates a partial detailed view of a bolt with an angular or spiral channel FIG. 11 diagrammatically illustrates a U-shaped clip with the locking nut system configured as a snap insert;

FIG. 12 diagrmmatically illustrates a cross-sectional view of the U-shaped clip with additional leg;

DETAILED DESCRIPTION OF THE PREFERRED EMBODIMENT

Figure 5:
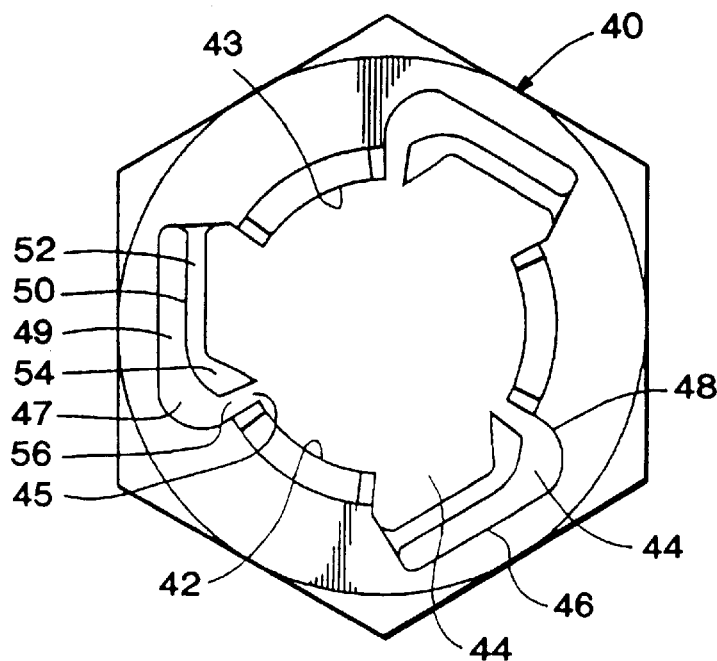
FIG. 5 depicts a top view of the nut.

The present invention relates to a nut and bolt combination that allows one-way rotational movement.

FIG. 1 illustrates one-way nut and bolt 10 including bolt 20 and nut 40. Bolt 20 includes head 22, stem 24, and bolt 26. FIG. 1 also shows channel 28.

Referring to FIGS. 2, 3 and 4, bolt 20 includes bolt head 22, stem 24, bolt thread 26, longitudinal channel 28, radially aligned channel surface 28', angularly displaced channel surface 28", notch 30 (defined by surfaces 28' and 28"), bolt crest 32, bolt trough 34, and triangular locking surface 38.

Referring particularly to FIGS. 1 and 2, bolt 20 has a bolt thread 26 thereon. Thread 26 is defined by a bolt crest 32 and a bolt trough 34. Longitudinal channel 28 extends through bolt thread 26 due to the longitudinal alignment of the notices in each bolt thread. Referring particularly to FIG. 2, radially aligned surface 28' and angularly displaced surface 28" converge to form a notch 30 at each thread crossing. FIG. 1 illustrates a plurality of aligned notches 30 which define longitudinal channel 28.

Figure 6:
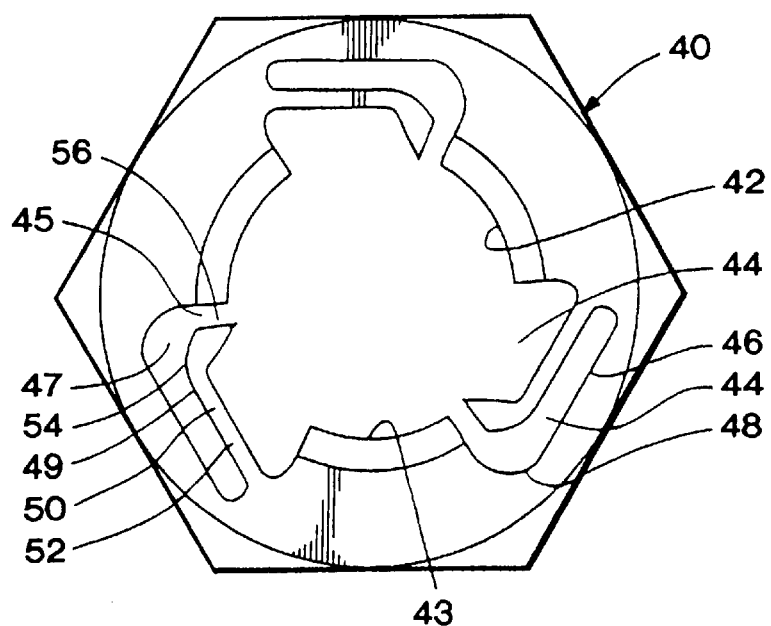
FIG. 6 shows a bottom view of the nut.
Figure 6A:
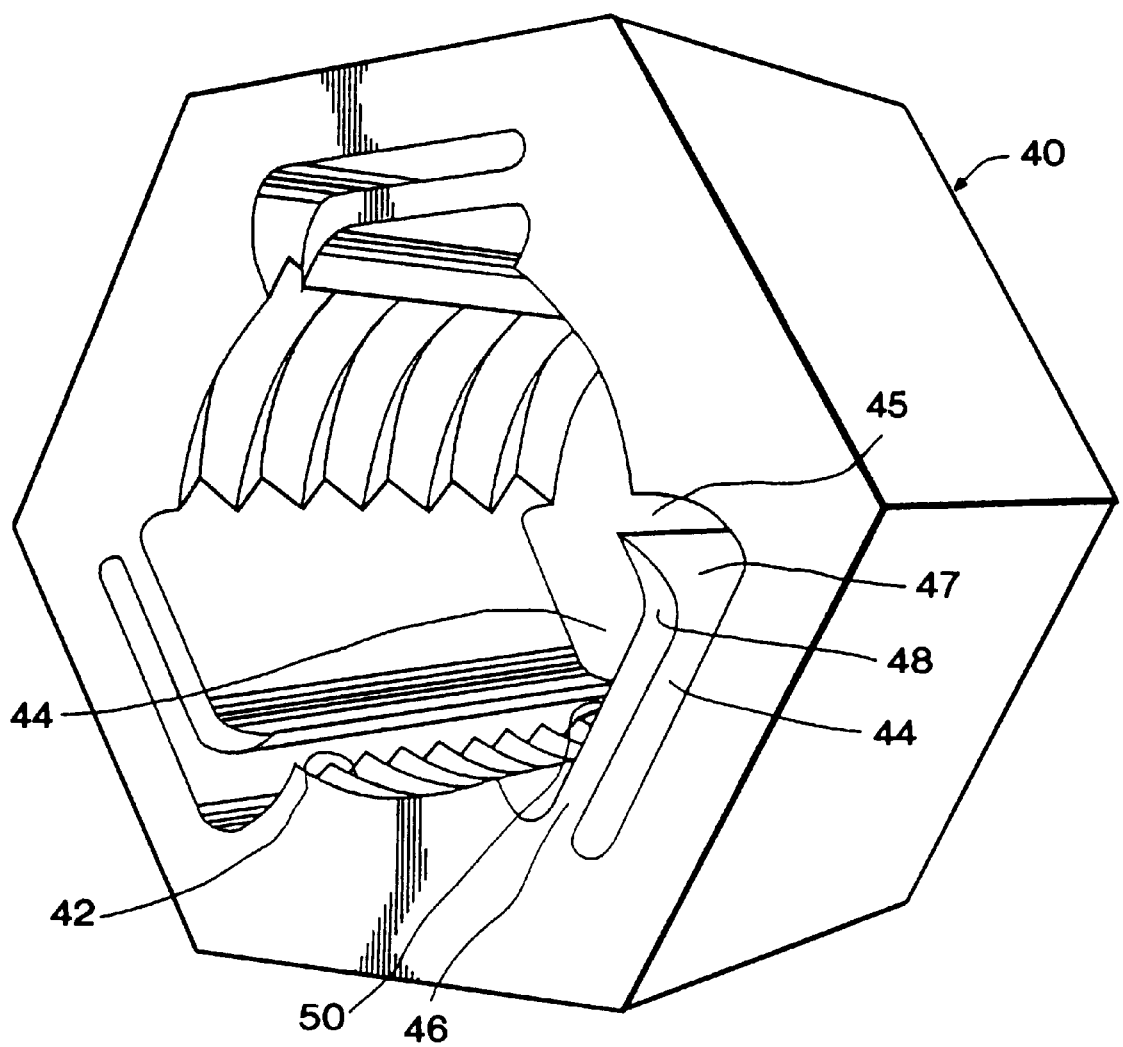
FIG. 6A illustrates a perspective view of the nut.

FIGS. 5, 6 and 6A illustrate nut 40 having bore 42, nut thread 43, longitudinal cut-out 44, straight wall portion 46, arcuate wall portion 48, mouth opening 45, throat opening 47, and compressible tine 50 disposed in the cut-out. Compressible tine 50 includes backside surface 49, straight body proximal portion 52, arcuate distal portion 54 and distal end surface 56.

FIGS. 1, 6, 7 and 8 illustrate bolt thread 26 and nut thread 43 cooperatively permitting a user to rotate nut 40 one way one bolt thread 26, thereby permitting generally one way translational movement towards head 22 in FIG. 1. During the translation of nut 40 along bolt threads 26, tines 50 are alternately compressed inboard into cut-out 44 by contacting bolt threads 26, and then released to expand into the bolt channel when distal end 56, of tine 50, is disposed in longitudinal channel 28. Tine 50 and triangular locking surface 38, of longitudinal channel 28, thereby cooperatively prevent rotation of nut 40 in direction L.

Figure 7:
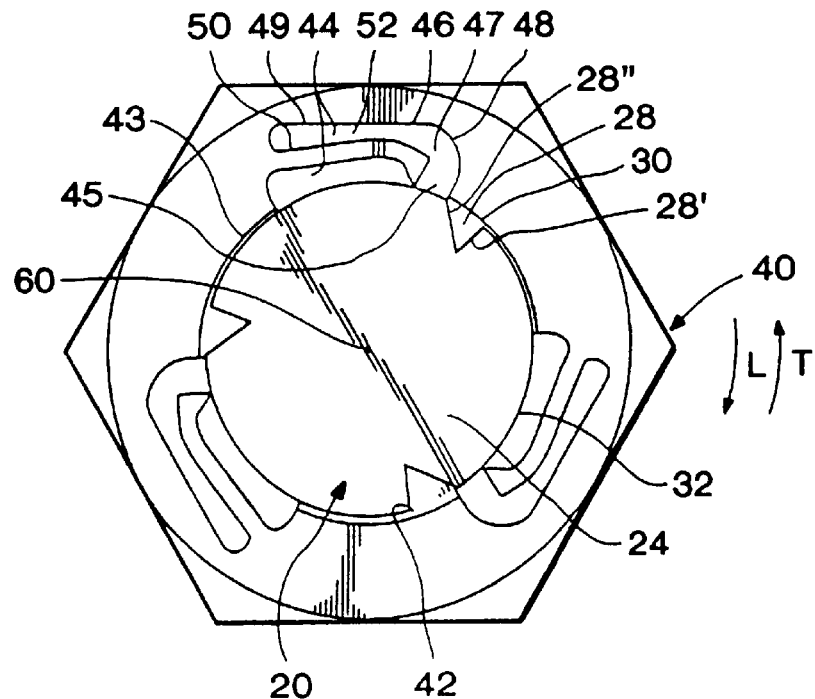
FIG. 7 depicts a bottom view of the present one-way nut and bolt combination when the tines are compressed inboard.

Referring particularly now to FIG. 7, it can be seen that a user desiring to translate nut 40 toward bolt head 22 may do so by rotating nut 40 in direction T. When tines 50 are compressed by bolt crest 32, due to contact between end 56 and crest 32, the tine 50 is flexed outboard, with respect to longitudinal central axis 60, best seen in FIGS. 1 and 7. When tine 50 flexes outboard, backside 49, of tine 50, is more closely disposed toward straight wall portion 46 and arcuate wall portion 48 of cut-out 44. As described above, tine 50 includes straight body proximal portion 52, arcuate distal portion 54, distal end 56 and backside 49. The straight body 52 and large open throat 47 permit multiple flexible movements of the tine in the cut-out.

Figure 8:
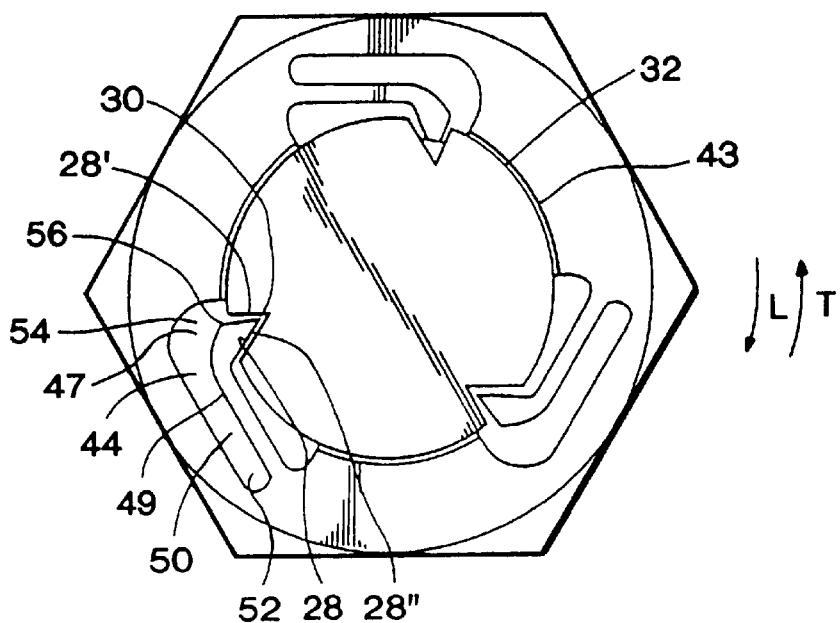
FIG. 8 shows the one-way nut and bolt combination when the tines are extended or in a locked position.

Referring now to FIG. 8, when nut 40 is rotated such that distal end 56 of tine 50 is disposed in longitudinal channel 28, counter-rotational movement, in direction L, cannot occur. End 56 abuts radial surface 28' and triangular locking surface 38 in FIG. 3. When nut 40 is rotated such that distal end 56, of tine 50, is received by notch 30, and correspondingly disposed in longitudinal channel 28, tine 50 is released from compression. As described above, longitudinal channel 28 is defined by radially aligned surface 28' and angularly displaced surface 28". In FIGS. 3 and 8, triangular locking surface 38 of radially aligned surface 28' abuts distal end 56 and prevents further rotation of nut 40 in direction L when tine 50 is disposed in longitudinal channel 28. A user desiring to continue to rotate nut 40 in direction T may do so and tine 50 will again be compressed when distal end 56 contacts bolt crest 32.

Referring now to FIGS. 4, 7, and 8, mouth 45 is defined by distal end 56 and arcuate wall portion 48. Throat 47 is defined by backside 49 of tine 50 and the distal end segment of arcuate wall portion 48 of cut-out 44. In FIGS. 4, 7 and 8, mouth 45 is narrower than and leads to a wider throat 47. When tine 50 is compressed by bolt crest 32, both mouth 45 and throat 47 narrow. However, mouth 45 continues to be somewhat narrower than throat 47.

The one-way nut and bolt combination is made from injected or molded plastic. Specifically, FIG. 6A is preferably made from plastic. The tines and the cut-outs in the nut extend longitudinally on an inboard surface through the threaded nut bore. In the preferred embodiment, each cut-out extends longitudinally through the entire nut. Similarly, a single tine extends throughout the longitudinal cut-out. Alternatively, multiple tines could be disposed, in an aligned manner, in each cut-out. Also, the cut-outs may extend only partially through the nut bore. The claims appended hereto are meant to cover this concept.

To remove the locked nut from the bolt, a tool having a single prong for each cut-out is inserted into the cut-out at a position radially inboard the body of the tine. This tool then compresses the tine (or tines if multiple, circumferentially spaced cut-out and tine configurations are utilized) and the compressed tine is radially moved outboard or away from the triangular locking surface at each bolt thread. The nut is moved or is translated away from the bolt head by substantially simultaneous counter-rotation of the nut, the outwardly disposed and compressed tine and the tool. In the illustrated embodiment, a three prong removal tool is utilized. The three prongs are joined together and circumferentially spaced apart the appropriate distance by a head plate or grid.

Another technique to remove the nut from the bolt involved the application of a high degree of reverse torque which causes the tine or tines to repeatedly "pop-out" of the notch over the triangular locking surface. Experimentally the has been removed up to 10 times without significant deterioration.

One-way nut and bolt 10 can be made of a variety of materials. In the preferred embodiment, one-way nut and bolt 10 is cast from long glass fiber nylon. One-way nut and bolt 10 can be produced utilizing a number of casting methods. In the preferred embodiment, a multi-cavity single injection mold, requiring no additional manufacturing steps, is used to produce one-way nut and bolt 10.

FIG. 9 diagrammatically illustrates a U-shaped clip 70 with a locking nut and bolt configuration and a bored panel 72. A partial view of bolt 74 shows an angular channel 76 formed on the bolt threads.

U-shaped clip 70 has two elongated, generally planar legs 78, 80. A nut thread 82 is formed on leg 78. Nut thread 82 may be one or more spirals defining the nut thread which is complementary to bolt threads 84 on bolt 74. Of course, rather than utilizing bolt 74 which has an angular or a spiral locking channel, the bolt shown in FIG. 1 may also be utilized. In one embodiment, nut thread 82 is formed on nut insert 86. Otherwise, the thread is formed directly on leg 78. Nut insert 86 has a predetermined outer shape (in the illustrated embodiment, a circular shape), which is complementary to a cavity in leg 78. In this manner, nut insert 86 can be inserted and captured by leg 78 and held in place.

Leg 80 of U-shaped member 70 includes a lockway 88. Lockway 88 is defined by a lockway bore 90 and one or more radial cut-outs 92, 94. Lockway 88 includes or defines one or more compressible tines 96, 98. As discussed earlier in connection with FIGS. 5 and 6, tines 96, 98 include a body portion and a distal end portion. Distal end portion 1 10 for tine 96 is identified in FIG. 9. The distal end portion is substantially radially aligned such that the end of the tine pops or is disposed into locking channel 76 of bolt 74.

Bored panel 72 includes a through-bore 112. Panel 72 is disposed between legs 78, 80 and lockway bore 90, panel bore 112 and nut bore 114 are coaxially aligned. After coaxial alignment of bores 90, 112, 114, bolt 74 is inserted into the lockway and one-way rotation is permitted while bolt thread 84 passes through lockway 88, panel bore 112 and nut bore 114. Bolt 74 is attached by its threads to nut thread 82. Counter-rotative movement of bolt 74 is prohibited due to tines 96, 98 falling into locking channel 76. It should be noted that a single tine and a single radial cut-out could be utilized. However, in a preferred embodiment, at least two radial cut-outs and corresponding tines are currently recommended. As stated earlier, these tines define a narrow mouth leading to a wider throat in the cut-out. The mouth is open to lockway bore 90. This is discussed in greater detail in connection with FIGS. 5, 6, 6A, 7 and 8 above. Panel bore 112 keeps bolt 74 in a coaxial position with respect to lockway 88 and nut bore 114.

In the illustrated embodiment in FIG. 9, lockway 88 is a stamped lockway created by stamping leg 80. In other words, leg 80, preferably made of metal, is stamped or cut out to form lockway 88. Other procedures to create lockway 88 could be utilized.

FIG. 10 diagrammatically illustrates a small, detailed portion of bolt 116. Bolt 116 includes bolt thread 120 with a thread crest 122 and a thread root 124. A notches 126 is formed through part or all of crest 122. The notch has a substantially radial triangular locking face 128 and an angularly disposed rising or slope face 130. Notch 126 forms a channel with notch 130 and 132. This channel as illustrated in FIG. 10 is angularly displaced with respect to the axial centerline C–L for bolt 116. The channel may define a spiral configuration on the bolt thread. Alternatively, notches 126, 130 and 132 could be randomly spaced about the bolt thread. However, in a preferred embodiment, the notches generally form a channel which has some type of geometric relationship with bolt 116. This geometric relationship may be a longitudinal channel (see FIG. 1), may be an angular channel (see FIG. 9) or may be a spiral about bolt centerline C–L. Further, multiple channels may be defined by a plurality of notches on the bolt thread. The plurality of notches is generally illustrated in FIG. 2. FIG. 2 also shows the substantially radially aligned locking face 128.

FIG. 11 diagrammatically illustrates a portion of a U-shaped clip having legs 140 and 142. Nut insert 144 provides nut threads 146 on leg 142. Lockway 150 is established on a lockway insert 152. Lockway 150 includes compressible tines located in radial cut-outs in lockway bore 154. Lockway insert 152 has a predetermined outer shape which is complementary to a cavity in leg member 140 of the U-shaped clip. Lockway insert 152 is captured by leg 140.

FIG. 12 diagrammatically illustrates a modified U-shaped clip with an additional leg. Clip 160 includes leg 162, intermediate leg 164 and additional leg 166. A panel 168 has a panel bore 170. Leg 162 of modified U-shaped clip 160 includes a lockway or locking thread LT. Intermediate leg 164 includes a nut thread TH. Additional leg 166 includes a hole or a bore H. A bolt is inserted as shown by arrow 172 through hole H, nut thread TH and locking thread LT. Alternatively, panel bore 170 could be slightly smaller and a self-threading bolt could be inserted through hole H in the direction shown by arrow 172. In this sense, nut threads TH on leg 164 could be eliminated. However, locking threads LT on leg 162 are required to lock the bolt inserted in direction 172 into hole H, the resulting hole replacing nut threads TH. Alternatively, panel 168 could be disposed in U-shaped channel 174. Alternatively, a second panel could be inserted in U-shaped channel 174. Also, FIG. 12 diagrammatically illustrates that the locking threads or lockway LT could be disposed on front leg 166, intermediate leg 164 or rear leg 162. This should be apparent by comparing the lockway 88 in FIG. 9 which is in a forward position with respect to nut threads 82. In FIG. 12, lockway LT is disposed in a rearward rather than a forward position with respect to the insertion in the direction 172 of the bolt. As another alternative, panel 168 could be pre-threaded to form a threaded nut. This is an alternative to the bolt self threading panel bore 170.

Figure 13:
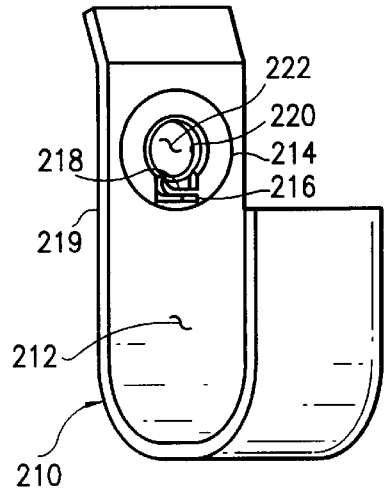
FIG. 13 diagrammatically illustrates a J-shaped clip with a locking nut insert.

FIG. 13 diagrammatically illustrates a J-shaped clip 210. J-clip 210 captures panel and U-shaped channel 212. In FIG. 13, insert 214 includes a radial cut-out 216, tine 218 and a plurality of nut threads 220. Nut threads 220 are disposed behind radial cut-out 216 and tine 218. Of course, J-shaped clip 210 retains a bored panel (not shown) in U-channel 212. The bore through the panel is coaxially aligned with insert bore 222.

Figure 14:
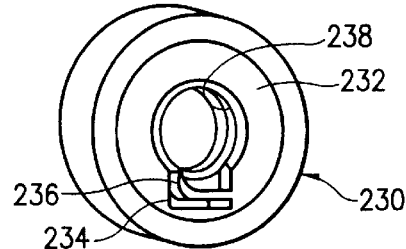
FIG. 14 diagrammatically illustrates a detailed view of the locking nut insert.

FIG. 14 diagrammatically illustrates a one-way locking nut insert 230. This insert has an end face 232, a radial cut-out 234, a compressible tine 236 and a plurality of nut threads 238. Compressible tine 236 operates in radial cut-out 234 in substantially the same manner as discussed above in connection with the compressible tines in FIGS. 5, 6, 6A, 7 and 8. One-way locking nut insert 230 is adapted to be disposed in and captured by leg 219 of J-shaped clip 210. See FIG. 13.

Figure 15:
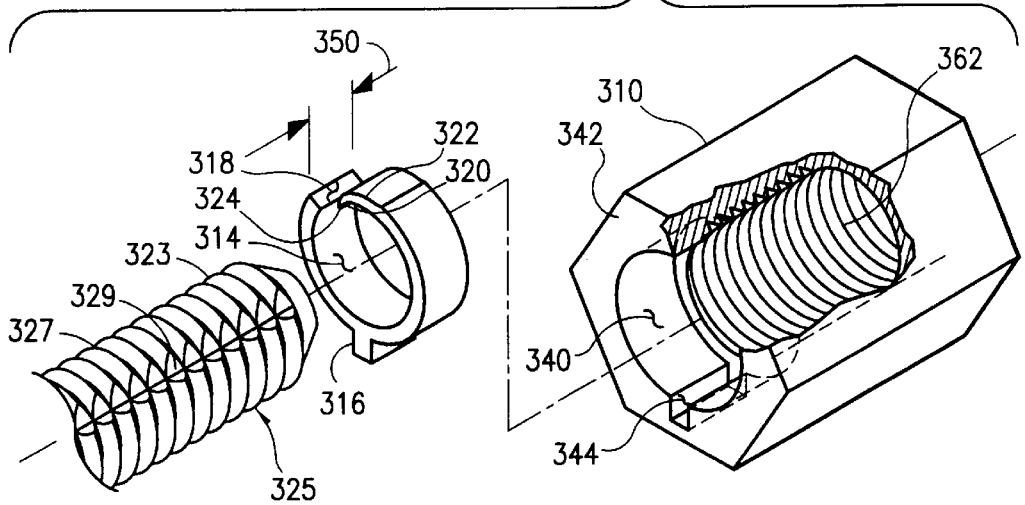
FIG. 15 diagrammatically illustrates a tine-bearing insert and associated nut.

FIG. 15 diagrammatically illustrates a one-way locking nut including a nut 310 and an insert 312. Preferably, insert 312 is made of spring steel but may be made of high impact or high density plastic. Insert 312 defines an insert bore 314, a radially extending key 316, a radial cut-out 318 and a compressible tine 320. Tine 320 has a body portion 322 and a distal end portion 324. Insert 312 is disposed in an insert cavity 340 defined by nut 310. Nut 310 has an end face 342 and a radial keyway 344. Keyway 344 is complementary shaped as compared with key 316. Of course, key 316 may not be precisely radially oriented with respect to the axial centerline of insert 312. However, it is most important that key 316 be complementary shaped as compared with keyway 344. In one embodiment, insert cavity 340 is about 0.04 inch deep. Insert 312 has a thickness 350 about 0.015 inches. The actual size of the cavity and the insert depend upon the use of the locking nut and bolt and the locking forces required by such usage. The insert nut in FIG. 15 is preferably made of metal.

Another important feature of the present invention is that key 316 run the longitudinal length shown by distance 350 along insert 312. Of course, keyway 344 must have substantially the same length as key 316. Due to the size of the keyway and the longitudinal extent of the keyway, compressive radial forces and torque forces acting on tine 320 are transferred throughout the length of insert 312 and the length of keyway 344. This transference of force over a sizable portion of the insert reduces the possibility of excessive wear and breakage of compressible tine 320. As discussed above in connection with FIGS. 7 and 8, compressible tine 320 moves radially inward along plane or and outward dependent upon whether the tine is riding on crest 323 (see the partial view of bolt 325 illustrated in FIG. 15) or whether the tine has fallen into one of the plurality of notches 329 or indentations defined in the bolt threads 327. When counterrotative force is applied to the bolt or the nut, compressive tine 320 locks against the triangular, radially aligned locking faces in noteles or indentations 329 on the bolt thread 327. The axial length of key 136 and keyway 144 distributes this counter-rotative torque or force throughout the length of insert 132 and, dependent upon the number or the length of threaded nut bore 362, throughout a substantial portion of nut 310. A spiral channel bolt as shown in FIG. 9 may also be used.

Figure 16:
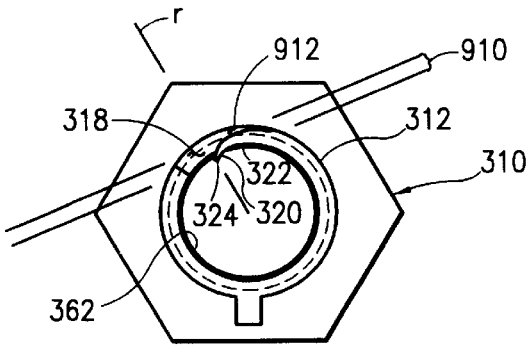
FIG. 16 illustrates an end view of a nut assembly carrying the tine-bearing locking insert.

As diagrammatically illustrated in FIG. 16, the one-way locking nut 310 has an insert 312 with a compressible tine 320 radially extending inward slightly beyond nut thread 362. Nut thread 362 is substantially similar to the nut thread shown in FIG. 15. Tine 320 has a substantially radically aligned distal end located in radial plane r.

Insert 312 defines a radial cut-out 318 within which tine 320 flexes. When tine 320 flexes radially outward due to the presence of a nut thread crest acting on the distal end of tine 320, the throat of cut-out 318 narrows. When tine 320 is disposed in a locking channel, the throat of cut-out 318 is larger. FIG. 16 shows that tine body portion 322 and distal end 324 fall inaplane 910. An interspace 912 is disposed radially beyond body and distal end plane 910. The interspace 912 between plane 910 and the recess in the nut end face enables the tine body to move radially outboard into the interspace when the distal end rides atop the crest of the bolt threads.

Figure 17:
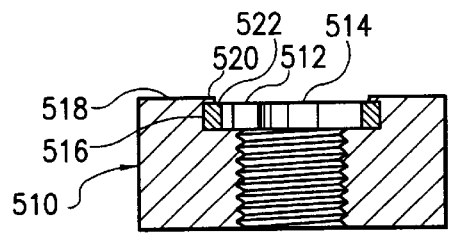
FIG. 17 diagrammatically illustrates a cross-sectional view of the nut assembly carrying the tine-bearing locking insert.

FIG. 17 diagrammatically illustrates a cross-sectional view of the one-way locking nut 510. In this illustrated embodiment, insert 512 includes a compressible tine 514. Insert 512 is captured in an annular groove 516 formed near end face 518 of locking nut 510. A radially inwardly extending lip 520 captures end face 522 of insert 512. Lip 520 is made by swaging the end face of the nut over the insert. If insert 512 is made of metal, and particularly spring steel, insert 512 can be slightly radially compressed due to the radial cut-out 318 shown in connection with insert 312 of FIG. 15. After slight radial compression, insert 512 can be disposed in and captured by annular groove 516 of nut 510. It is important to note that these figures are not made to scale. The insert can be quite small, on the order of less than one-quarter inch thick. However, the thinner the insert, the less locking capability the one-way locking nut and bolt assembly provides to the other components. In a preferred embodiment, radial cut-out 318 spans an arc of less than 30 degrees and more than 5 degrees of the total circumference of insert 312. See FIG. 15.

If a spiral path is selected for the locking channel on the bolt, the axial length 350 of tine 320 (see FIG. 15) must be commensurate with the number of threads covered by the tine. In other words, there must be a correspondence between the number of notches or indentations on the bolt thread such that the tine falls within one or more predetermined notches to adequately lock the bolt with respect to the nut. If compressible tine 320 has a large longitudinal span 350, it may not be possible to utilize a spiral or an angled locking channel on the bolt. On the other hand, a very thin insert 312 could be utilized such that only one or two bolt crests are impacted by compressible tine 320.

Figure 18:
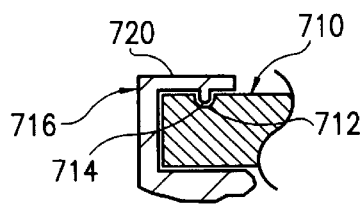
FIG. 18 diagrammatically illustrates concave dimples on the insert which lock the insert to the nut by swaged locking nipples.

FIG. 18 diagrammatically illustrates insert 710 having one or more small, concave cavities or dimples 712 which are filled with a swaged nipple 714 of the nut 716. When the nut end face 720 is swaged, nipple 714 is formed by filling concave dimple 712. This locks the insert into the nut. This also eliminates the need for the key and keyway shown in FIGS. 15 and 16. By eliminating the key-keyway system, the locking nut can be easily manufactured without requiring alignment of the key in the keyway. The swaged nipples (preferably three) lock the insert to the nut by filling the dimples.

The claims appended hereto are meant to cover modifications and changes within the spirit and scope of the present invention.

What is claimed is:

1. A one way locking nut and bolt combination comprising:
   an elongated bolt having a head, a stem and a bolt thread on said stem, said bolt having a plurality of notches on each bolt thread within form a locking channel on said stem,
   a nut having an end face with a recess thereon, a threaded bore that is complimentary to said bolt thread and having an axial keyway;
   an insert having a cylindrical body which defines an insert bore slightly larger in diameter than said threaded nut bore, said cylindrical body insert having a radial cut-out along an arcuate portion of said insert bore, said insert having a radial key extending therefrom which is complimentary to said nut keyway;
   said insert mounted in said recess beneath said end face of said nut coaxial with said threaded nut bore and said insert key being disposed in said nut keyway;
   a compressible tine extending into said cut-out from said cylindrical insert body and having body portion and substantially radially aligned distal end portion, said body portion and said distal end portion are substantially disposed in a tine plane which is tangential to said nut bore, said distal end portion of said tine and said body portion defining a narrow mouth along its extreme edge leading to a throat in said cut-out, said throat including a radially outboard interspace radially beyond said tine plane, said interspace being tangential to said nut bore and said interspace disposed in an interspace plane parallel to and adjacent said tine plane, said mouth opening to said insert bore;
   whereby said nut thread, said tine and said bolt thread cooperatively permit translation of said nut along said bolt threads by one-way rotation, while said tine is alternately flexed radially outboard into said interspace which is parallel to said tine plane by said bolt threads and released when said tine is disposed in said locking channel, said locking channel and respective plurality of notches preventing counter-rotational movement of said nut and bolt when said end of said tine is positioned in one of said plurality of notches;
   said tangential interspace of said throat being large enough to accommodate radial movement of said tine when said tine is flexed outboard by said bolt threads.

2. A one way nut and bolt combination as claimed in claim 1 wherein said cut-out extends an axial length of said insert and said key extends the axial length of said insert such that radially compressive forces and rotational and counter-rotational forces are longitudinally distributed throughout said insert via said key to said nut keyway.

3. A one way nut and bolt combination as claimed in claim 1 wherein said nut keyway extends only part way through said threaded nut bore.

4. A one way nut and bolt combination as claimed in claim 1 wherein said insert defines a plurality of radial cut-outs and corresponding tines for locking on said bolt thread.

5. A one way nut and bolt combination as claimed in claim 1 wherein said radial cut-out spans an arc of less than 30 degrees and more than 5 degrees.

6. A one way nut and bolt combination as claimed in claim 1 wherein said nut end face has a radially inward extending lip and an annular groove behind said lip, said annular groove sized to closely capture said insert therein with said lip engaging an end face of said insert.

7. A one way nut and bolt combination as claimed in claim 1 wherein said insert has an insert end face defining one or more concave dimples, said nut end face has a radially inward extending lip and one or more corresponding nipples filling said dimples on said insert to capture said insert therein.

8. A locking nut and bolt system comprising:
   an elongated bolt having a head, a stem and a bolt thread on said stem, said bolt having a plurality of deep indentations on each bolt thread which form a locking channel on said stem;
   a nut having an end face with a recess thereon, a threaded bore that is complimentary to said bolt thread and having an axial keyway;
   an insert having a cylindrical body which defines an insert bore slightly larger in diameter than said threaded nut bore, said insert having a radial cut-out along an arcuate portion of said insert bore, said insert having a radial key extending therefrom which is complimentary to said nut keyway;
   said insert mounted in said recess beneath said end face of said nut coaxial with said threaded nut bore and said insert key being disposed in said nut keyway;
   a compressible tine extending into said cut-out from said cylindrical insert body and having body portion and substantially radially aligned distal end portion, said body portion and said distal end portion substantially disposed in a tine plane which is tangential to said threaded bore, said distal end portion of said tine and said body portion defining a narrow mouth along its extreme edge leading to a throat in said cut-out, said throat including a radially outboard interspace radially beyond said tine plane, said interspace being tangential to said threaded bore and in an interspace plane parallel to and adjacent with respect to said tine plane, said mouth opening to said insert bore;
   whereby said nut thread, said tine and said bolt thread cooperatively permit translation of said nut along said bolt threads by one-way rotation, while said tine is alternately flexed outboard into said interspace plane by said bolt threads and released when said tine is disposed in said locking channel formed by said plurality of deep indentations, said locking channel and respective plurality of indentations preventing counter-rotational movement of said nut and bolt when said end of said tine is positioned in at least one of said plurality of indentations;

said tangential interspace of said throat being large enough to accommodate radial movement of said tine when said tine is flexed outboard by said bolt threads.

9. A locking nut and bolt system as claimed in claim 8 wherein said cut-out extends an axial length of said insert and said key extends the axial length of said insert such that radially compressive forces and rotational and counter-rotational forces are longitudinally distributed throughout said insert via said key to said nut keyway.

10. A locking nut and bolt system as claimed in claim 9 wherein said deep indentations are longitudinally aligned on said bolt stem.

11. A locking nut and bolt system as claimed in claim 10 wherein said indentations extend over a longitudinal portion of said bolt thread greater than said longitudinal extent of said nut.

12. A locking nut and bolt system as claimed in claim 9 wherein said indentations are aligned along a spiral path about said bolt thread.

13. A locking nut and bolt system as claimed in claim 8 wherein said nut keyway extends only part way through said threaded nut bore.

14. A locking nut and bolt system as claimed in claim 8 wherein said insert defines a plurality of radial cut-outs and corresponding compressible tines for locking on said bolt thread.

* * * * *

UNITED STATES PATENT AND TRADEMARK OFFICE
CERTIFICATE OF CORRECTION

PATENT NO. : 5,951,224
DATED : September 14, 1999
INVENTOR(S) : Robert J. DiStasio, et al.

It is certified that error appears in the above-identified patent and that said Letters Patent is hereby corrected as shown below:

<u>Title page,</u>
(75) Inventor: after "Robert J. DiStasio, Vahalla, N.Y." please insert -- Stephen G. Bowling, Stanford, CT and Carl Richard Stanley, Greenwich, CT --

Signed and Sealed this

Twenty-first Day of August, 2001

*Attest:*

*Attesting Officer*

NICHOLAS P. GODICI
*Acting Director of the United States Patent and Trademark Office*